(12) United States Patent
Singh et al.

(10) Patent No.: US 7,334,982 B2
(45) Date of Patent: Feb. 26, 2008

(54) APPARATUS FOR SCAVENGING LUBRICATING OIL

(75) Inventors: Anant Pal Singh, Cincinnati, OH (US); Stephen Anthony Wilton, Westchester, OH (US); Duane Howard Anstead, Fairfield, OH (US); Barry Lynn Allmon, Maineville, OH (US)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 11/123,627

(22) Filed: May 6, 2005

(65) Prior Publication Data

US 2006/0251512 A1 Nov. 9, 2006

(51) Int. Cl.
*F01D 25/00* (2006.01)

(52) U.S. Cl. ............... 415/111; 415/174.4; 415/230

(58) Field of Classification Search ........... 415/111, 415/112, 174.2, 231, 174.4, 230
See application file for complete search history.

(56) References Cited

U.S. PATENT DOCUMENTS

| | | | |
|---|---|---|---|
| 3,844,440 A * | 10/1974 | Widlansky et al. | 60/39.08 |
| 4,468,066 A | 8/1984 | Alcorta et al. | |
| 4,525,995 A | 7/1985 | Clark | |
| 4,570,947 A | 2/1986 | Smith | |
| 4,576,001 A | 3/1986 | Smith | |
| 4,631,009 A | 12/1986 | Cygnor et al. | |
| 4,683,714 A | 8/1987 | Thebert | |
| 5,319,920 A | 6/1994 | Taylor | |
| 5,489,190 A | 2/1996 | Sullivan | |
| 6,443,698 B1 * | 9/2002 | Corattiyil et al. | 416/1 |
| 6,877,950 B2 * | 4/2005 | Liu | 415/111 |
| 7,080,620 B2 | 7/2006 | Aronsson et al. | |
| 7,124,857 B2 | 10/2006 | Gekht et al. | |

* cited by examiner

*Primary Examiner*—Ninh H. Nguyen
(74) *Attorney, Agent, or Firm*—William Scott Andes; Armstrong Teasdale LLP

(57) ABSTRACT

An apparatus for scavenging lubricating oil comprises an integrated slinger/runner rotatable with the turbine engine rotor discourages oil seepage out of an oil sump of a forward bearing for a gas turbine engine during all operating conditions of the gas turbine engine from idle to take-off speeds and during static non-operation. The apparatus includes a runner comprising an axially forward section and a frusto-conical aft section, and a slinger joined coaxially integrally to the aft frusto-conical aft section. The apparatus includes a means for blocking flow of oil from the frusto-conical aft section toward the axially forward section.

20 Claims, 5 Drawing Sheets

APPARATUS FOR SCAVENGING LUBRICATING OIL

BACKGROUND OF THE INVENTION

This invention relates generally to gas turbine engines and, more particularly, to apparatus for scavenging lubricating oil from the structure of a bearing during all operating conditions.

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the high pressure turbine extracts more energy from the gas stream for driving a fan. The fan provides the main propulsive thrust generated by the engine.

Typically, a rotor shaft is supported within a non-rotating stator by bearings used in the turbine engine to accurately locate and rotatably mount the rotor with respect to the stator. The bearings are typically surrounded by oil sumps which contain lubricating oil which is sprayed onto the bearings. The bearing and sump are isolated from the hot gas path by a seal which prevents oil leakage from the sump and hot gas entry into the sump. The seal is a contact seal, typically a non-metallic brush seal or carbon seal. At low power points in the operation of the engine, lubricating oil tends to seep toward the seal. Any oil accumulation near the contact seal can cause coking or the creation of varnish on the seal surfaces, which can cause deterioration of seal performance.

BRIEF DESCRIPTION OF THE INVENTION

One embodiment of an apparatus for scavenging lubricating oil employs a runner comprising a generally cylindrical forward section and an aft generally frusto-conical section and a generally disk-shaped slinger integrally joined coaxially to the axially aft end of the runner. The runner also comprises a means for blocking oil flow in the forward direction along its outer surface, which in the first embodiment comprises a circumferential groove in the outer surface of said runner between said forward section and said aft section.

In another embodiment of the apparatus as described in the previous paragraph, the means for blocking flow of oil forward along the outer surface of said runner further comprises a radially stepped ring surface downstream of said contact surface.

In another embodiment an apparatus for scavenging lubricating oil comprises a generally cylindrical forward section a frusto-conical aft section tapered radially outwardly integral with a disk-shaped slinger and having means for blocking flow of oil forward along said runner comprising at least one separating wall extending radially outwardly from said frusto-conical aft section of said runner.

In yet another embodiment, an apparatus for scavenging lubricating oil, a means for blocking flow of oil forward along said runner comprises an abradable strip mounted on a generally cylindrical extension of a stationary seal holder oriented parallel to the rotor axis of rotation, for contacting at least one separating wall mounted on a tapered section of a runner.

DETAILED DESCRIPTION OF THE INVENTION

Figure 1:
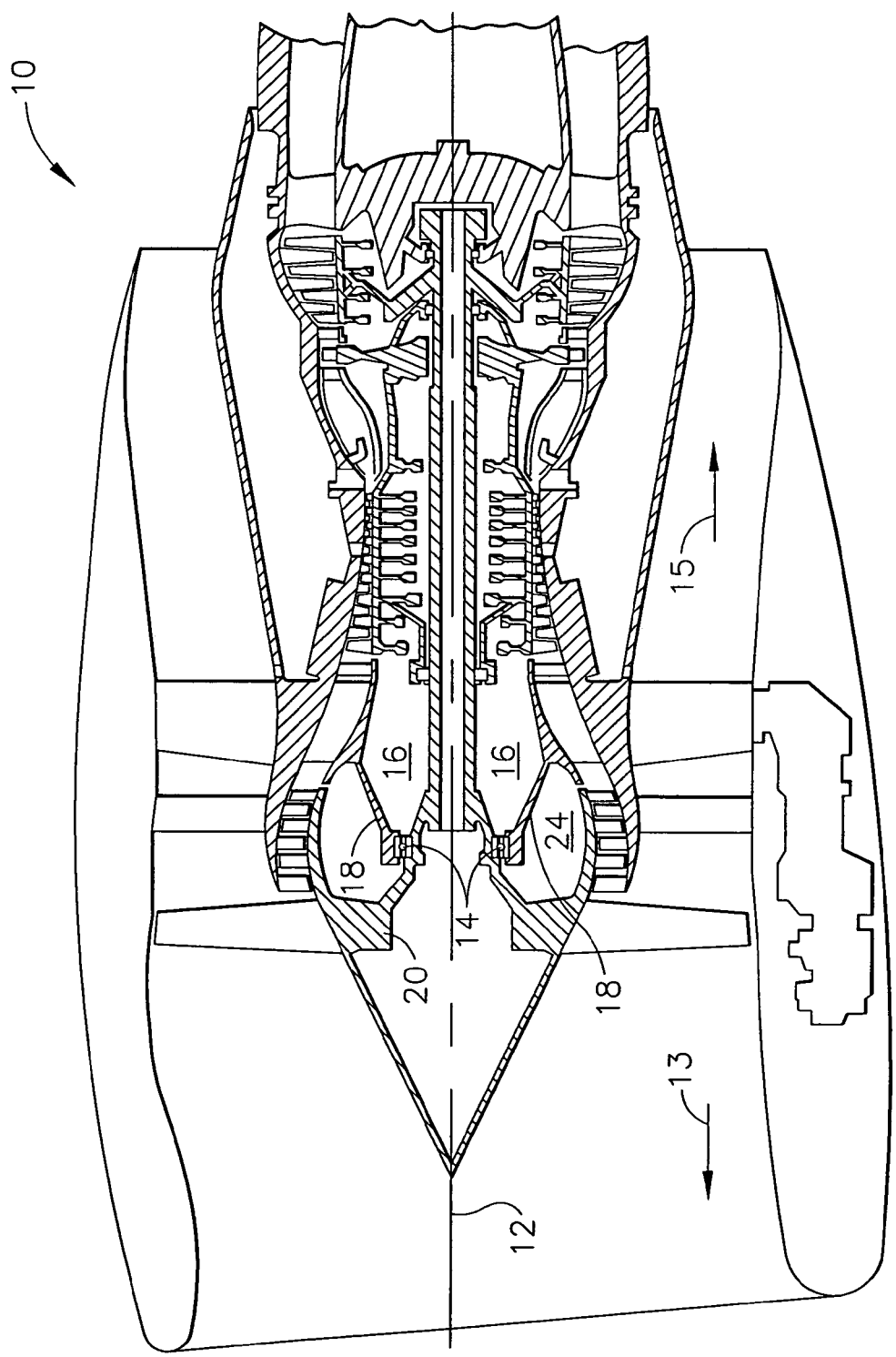
FIG. 1 is a schematic cross-sectional view of a gas turbine engine incorporating an apparatus for scavenging lubricating oil.

FIG. 1 schematically illustrates a gas turbine engine 10 which includes a stationary engine stator structure and a rotor structure mounted for rotation around longitudinal axis 12. As used herein "forward" refers to the upstream axial direction as shown by arrow 13 and "aft" refers to the downstream axial direction of air flow as shown by arrow 15. The forward end of the rotor 20 is rotationally supported within stator 18 by forward bearing 14. An oil sump 16 is defined about the forward bearing 14, and the oil sump 16 is pressurized by air provided to cavity 24.

Figure 2:
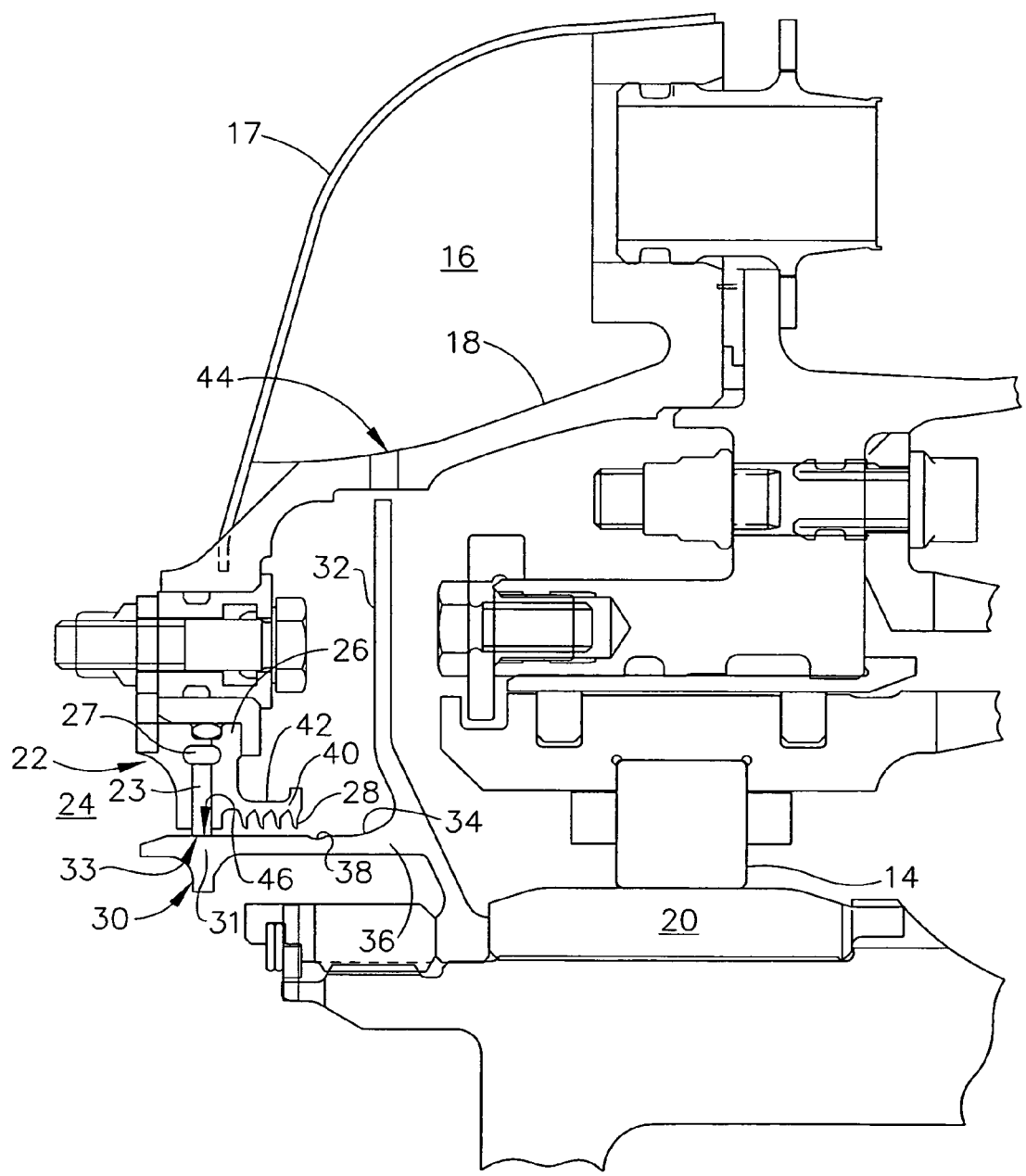
FIG. 2 is a schematic, partial cross-sectional view of one embodiment of an apparatus for scavenging lubricating oil incorporating an integrated slinger/runner apparatus.

FIG. 2 schematically illustrates a gas turbine bearing structure which includes one embodiment of an integrated slinger/runner. The stator 18 supports the rotor 20 via forward bearing 14. Oil lubricating the forward bearing 14 within the oil sump 16 is supplied via conduit 17. A sump seal 22 including generally annular contact brush seal 23 is located forward of the oil sump 16 to seal the forward end of the oil sump 16. Pressurized air in the cavity 24 provides a positive air pressure on the exterior of the sump seal 22. Runner 30 comprises a generally cylindrical axially forward section 31 concentric with the axis of rotation of the rotor 20, having circumferential radially outer contact surface 46 axially aligned with sump seal 22, and a frusto-conical aft section 36 having radially outwardly tapered exterior surface 34. A circumferential groove 38 extends around the radially outer surface of runner 30 axially between radially outer contact surface 46 of axially forward section 31 and radially outwardly tapered exterior surface 34 of frusto-conical aft section 36. Slinger 32 comprises a generally circular disk attached to the axially aft end of frusto-conical aft section 36 of runner 30 to form an integrated slinger/runner. Slinger 32 is generally axially aligned with a plurality of scavenge ports 44 in flow communication with the oil sump 16.

The stationary seal support structure 26 supports generally annular contact brush seal 23 so that seal surface 33 is axially aligned with radially outer contact surface 46 of runner 30. O-ring 27 seals the oil sump 16 to block oil leakage out of the sump and hot gas leakage into the oil sump 16. Stationary seal support structure 26 includes cylindrical sleeve 40 extending axially aftward from stationary seal support structure 26. The radially exterior surface of cylindrical sleeve 40 is formed as a circumferential scavenger groove 42 and the radially inner circumference thereof includes a circumferential, helical groove 28 in contact with the axially aft portion of radially outer contact surface 46.

During rotational operation of the gas turbine engine 10, lubricating oil is provided to the bearing by spray mechanisms (not shown) and pressurized air is applied to the exterior of sump seal 22 to prevent oil leakage through the sump seal 22. The oil sump 16 is vented to maintain proper pressure balance between the volume exterior to the oil sump 16 and the interior of the oil sump 16. In scavenging lubricating oil during normal operation of the gas turbine engine, oil from the forward bearing 14 driven by centrifugal force is pumped away from sump seal 22 by rotation of the runner 30 in contact with circumferential, helical groove 28 and radially outwardly tapered exterior surface 34, and by slinger 32 toward the scavenge ports 44. During slow speed operation or when engine rotation is stopped, oil is drawn by gravity forwardly along the surface of runner 30 toward the sump seal 22, but contact of oil with sump seal 22 is blocked by circumferential groove 38, which scavenges oil from radially outwardly tapered exterior surface 34 and directs it toward the bottom of the runner 30 where it is drawn by gravity along slinger 32 toward the bottom scavenge port. Circumferential scavenger groove 42 collects oil from the stationary seal support structure 26 at all operating conditions and channels it to scavenge ports 44 at the bottom of the annular structure.

Figure 3:
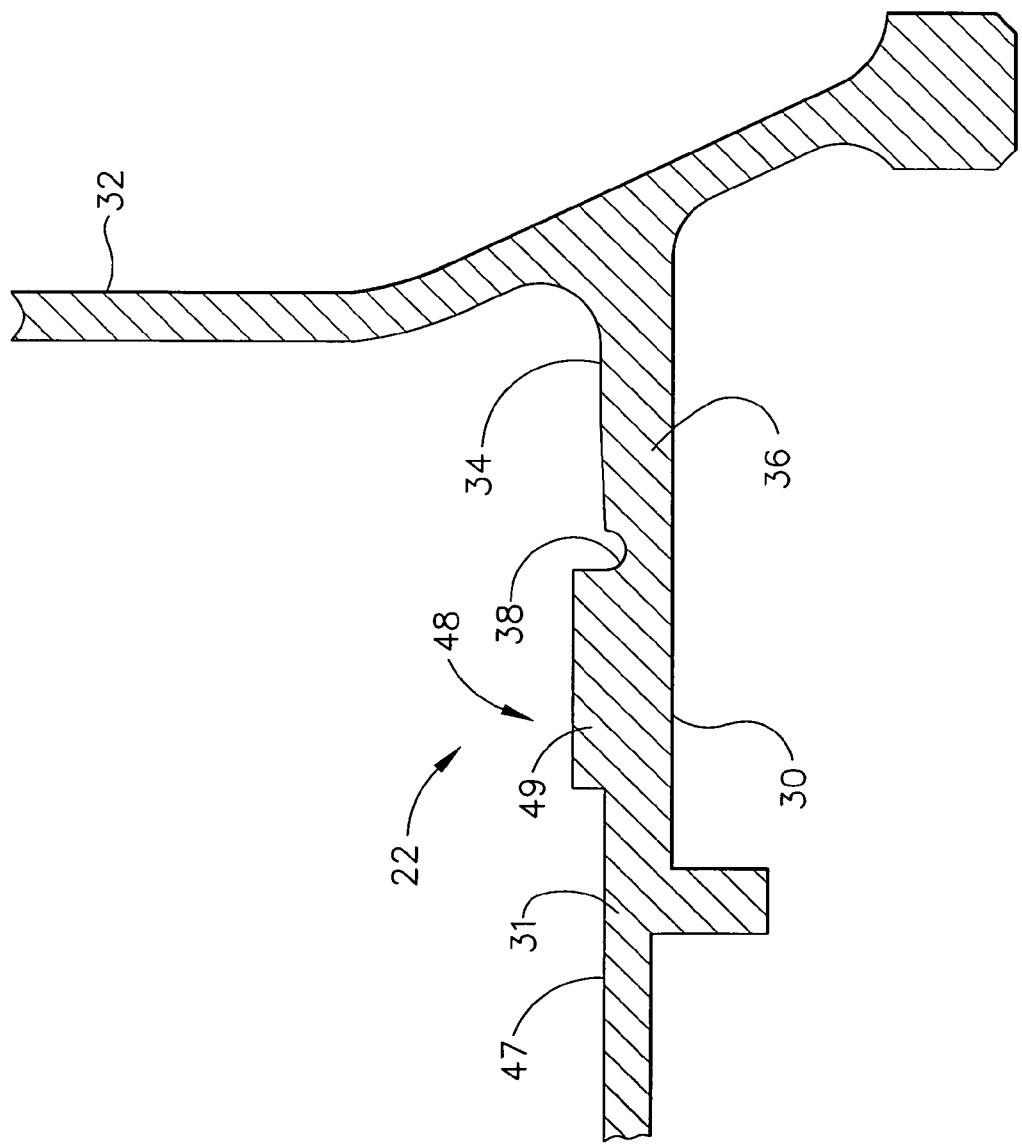
FIG. 3 is a schematic partial cross-sectional illustration of an alternative embodiment of an apparatus for scavenging lubricating oil incorporating an integrated slinger/runner.

FIG. 3 is a detailed partial cross-sectional schematic illustration of a modification of an integrated slinger/runner as shown in FIG. 2. The axially forward section 31 of runner 30 includes a radially outer contact surface 47. Axially downstream of radially outer contact surface 47, runner 30 incorporates a radially outwardly stepped ring 49 having stepped surface 48 projecting radially outwardly from the radially outer contact surface 47. Circumferential groove 38 is disposed axially between radially outwardly stepped ring 49 and radially outwardly tapered exterior surface 34 which tapers radially outwardly at an angle between one and four degrees in the downstream direction. Stepped surface 48 projects radially outwardly by a height sufficient to block oil from overflowing circumferential groove 38 axially upstream and has a surface roughness sufficient to inhibit flow of oil axially upstream. Slinger 32 is integral with the frusto-conical aft section 36 of runner 30. During engine operation radially outwardly stepped ring 49 is in contact with circumferential, helical groove 28 and inhibits seepage of oil toward sump seal 22 during rotation of runner 30. Radially outwardly stepped ring 49 also enhances the effectiveness of circumferential, helical groove 28 in scavenging oil at slow rotation or during static conditions to block oil flow forward along the surface of the runner 30.

Figure 4:
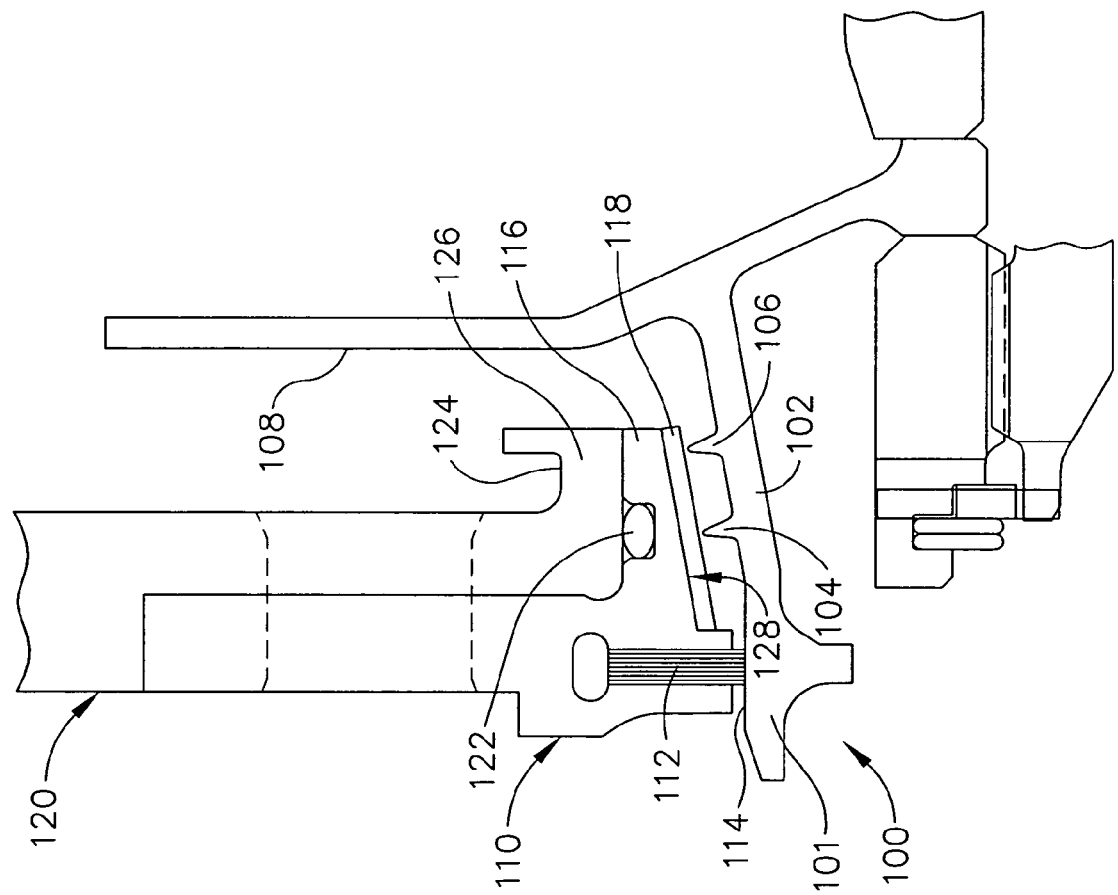
FIG. 4 is a schematic, partial cross-sectional illustration of another alternative embodiment of an apparatus for scavenging lubricating oil incorporating an integrated slinger/runner.

FIG. 4 schematically illustrates another embodiment of an apparatus for scavenging lubricating oil including an integrated slinger/runner. Generally cylindrical runner 100 includes a generally cylindrical forward section 101 and a frusto-conical aft section 102 from which at least one separating wall projects generally radially and perpendicular to the axis of rotation. Although two separating walls 104, 106 are shown, it will be understood that a single separating wall or several may be used depending on material properties of the wall or walls and expected operating conditions of the engine. The stationary contact seal holder 110 supports the contact seal 112 which engages radially exterior surface 114 of generally cylindrical runner 100. At its axially aft end, frusto-conical aft section 102 is integrally connected to disk-shaped slinger 108. The stationary contact seal holder 110 further includes a cylindrical axial extension 116 extending axially aft of the contact seal 112 and supports stationary abradable strip 118 on its radially inner frusto-conical surface 128. The cylindrical axial extension 116 is tapered radially outwardly relative to the axis of rotation in the downstream direction to align stationary abradable strip 118 with the radially outer tips of separating walls 104, 106. The stationary contact seal holder 110 is secured to the stationary seal support structure 120 by welding or other suitably robust technique and O-ring seal 122 prevents air leakage into the sump and oil leakage from the sump. A circumferential groove 124 extends circumferentially around cylindrical axial member 126. The tapered structure of the frusto-conical aft section 102 in FIG. 4 with multiple separating walls 104, 106 extends generally perpendicularly to the stationary abradable strip 118, to pump the oil away from the contact seal 112 to block oil flow axially upstream toward contact seal 112 during engine operation. Most of the oil will be contained inside the sump due to the disc pump action of the disk-shaped slinger 108. Any residual oil or oil/air mixture passing over the disk-shaped slinger 108 will be centrifuged back to a scavenge port (not shown in FIG. 4). The oil/air mixture reaching the tapered surface of stationary abradable strip 118 by whatever mechanism, will contact one of the separating walls 104, 106 and drain back into the sump. The proposed design provides a near zero oil leakage possibility even under the situations with little or zero pressurization margins. Circumferential groove 124 scavenges oil from the stationary seal support structure 120 at all operating conditions to direct it toward the bottom of the support structure and oil scavenge ports.

Figure 5:
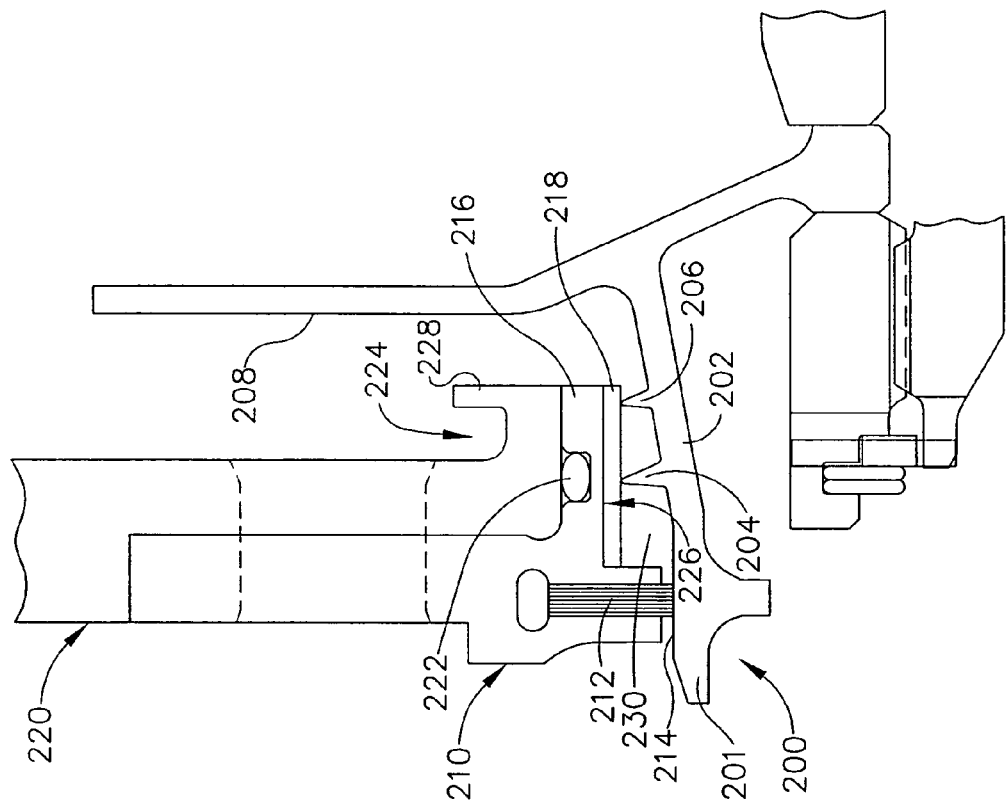
FIG. 5 is a schematic, partial cross-sectional illustration of yet another embodiment of an apparatus for scavenging lubricating oil incorporating an integrated slinger/runner.

FIG. 5 is yet another preferred embodiment of an apparatus for scavenging lubricating oil including an integrated slinger/runner. Runner 200 includes generally cylindrical forward section 201 and a frusto-conical aft section 202 having separating walls 204, 206 integral with disk-shaped slinger 208. The FIG. 5 design requires at least one separating wall. Stationary contact seal holder 210 supports contact seal 212 axially aligned to engage radially exterior contact surface 214 of generally cylindrical forward section 201. Stationary contact seal holder 210 also includes axially extending hollow cylindrical member 216 with abradable strip 218, covering the radially inner cylindrical surface 226 of axially extending hollow cylindrical member 216. The axially extending hollow cylindrical member 216 and abradable strip 218 extend axially generally parallel to the rotor axis of rotation. The radial heights of the respective separating walls 204, 206 are selected to maintain contact with the mating abradable strip 218. The stationary contact seal holder 210 is attached to stationary seal support structure 220, and O-ring seal 222 prevents leakage between stationary contact seal holder 210 and stationary seal support structure 220. An axially extending cylindrical member 228 extends axially from stationary seal support structure 220 and provides circumferential groove 224 to scavenge oil from the support structure during all operating conditions.

The design of FIG. 5 is preferred in turbine engine designs requiring accommodation of significant axial movement of the rotor components relative to stator components due to thermal cycles, rotational speed variation or other operating conditions. The axially extending hollow cylindrical member 216 accommodates axial movement of frusto-conical aft section 202 and separating walls 204 and 206 relative to abradable strip 218 without exerting significant axial load on separating walls 204, 206 or allowing loss of contact between separating walls 204, 206 and abradable strip 218. Air flow which leaks through the contact seal 212 will be diffused in the first separating wall cavity 230, and the swirling will create resistance to air leakage into the sump. Additionally, use of the abradable strip 218 allows the tighter radial clearances to further reduce the air leakage into the sump. The proposed features eliminate oil collection near the contact seal 212, and at the same time minimize air flow into the sump. This design also provides the additional feature of continuing to resist lubricating oil leakage even if the primary contact seal 212 failed or the pressurization margins were lost.

While the invention has been described in terms of various specific embodiments, those skilled in the art will recognize that the invention can be practiced with modification within the spirit and scope of the claims.

What is claimed is:

1. An integrated slinger/runner apparatus comprising:
    a rotatable generally cylindrical runner comprising an axially forward section and a frusto-conical aft section, and means for blocking oil flow axially forward along said runner from said frusto-conical aft section toward said axially forward section, said means for blocking oil flow is defined between said axially forward section and said frusto-conical aft section;
    a generally circular disk slinger integrally coaxially attached to said runner at the downstream end of said frusto-conical aft section; and
    a stationary seal support structure for supporting a sump seal and a cylindrical sleeve extending axially downstream from said stationary seal support structure.

2. The apparatus of claim 1, wherein said means for blocking oil flow axially forward comprises:
    a circumferential groove disposed in the radially outer surface of the runner axially between said axially forward section and said frusto-conical aft section.

3. The apparatus of claim 2, wherein said means for blocking oil flow axially forward further comprises:
    a radially outwardly stepped ring disposed axially upstream of said circumferential groove and having a stepped surface stepped radially outwardly from the outer surface of said axially forward section.

4. The apparatus of claim 1, wherein said means for blocking oil flow axially forward comprises:
    at least one generally annular separating wall extending from and generally perpendicular to the radially outer surface of said frusto-conical aft section.

5. An oil scavenging apparatus for a gas turbine engine oil sump seal comprising:
    an axially elongated generally cylindrical runner comprising:
    an axially forward section having an exterior cylindrical radially outer contact surface;
    a frusto-conical aft section integrally connected to said axially forward section and having a radially outwardly tapered exterior surface tapered radially outward in the aft direction; and
    means for blocking oil flow axially forward along said runner from said radially outwardly tapered exterior surface of said frusto-conical aft section toward said radially outer contact surface of said axially forward section, said means for blocking oil flow is defined between said axially forward section and said frusto-conical aft section;
    a generally cylindrical disk-shaped slinger integrally connected coaxially to the axially aft end of said frusto-conical aft section of said generally cylindrical runner; and
    a stationary seal support structure for supporting a sump seal and a cylindrical sleeve extending axially downstream from said stationary seal support structure.

6. The apparatus of claim 5,
    wherein said cylindrical sleeve has a circumferential scavenger groove in the radially external surface of said cylindrical sleeve.

7. The apparatus of claim 5, wherein said means for blocking oil flow comprises:
    a circumferential groove in the radially outer surface of said runner disposed axially between said radially outer contact surface of said axially forward section and said radially outwardly tapered exterior surface of said frusto-conical aft section.

8. The apparatus of claim 7, wherein said means for blocking oil flow further comprises:
    a radially outwardly stepped surface disposed axially aft of said cylindrical radially outer contact surface and immediately axially forward of said circumferential groove.

9. The apparatus of claim 5, wherein said means for blocking oil flow further comprises:
    a circumferential, helical groove disposed on the radially inner surface of said cylindrical sleeve.

10. The apparatus of claim 5, wherein said means for blocking oil flow comprises:
    at least one generally annular separating wall extending generally radially from and generally perpendicular to the radially outer surface of said frusto-conical aft section.

11. The apparatus of claim 10, further comprising:
    a contact seal mounted onto a stationary seal support structure by a stationary contact seal holder; and
    a first generally cylindrical axial extension extending axially downstream from said stationary contact seal holder and having a stationary abradable strip covering the radially inner frusto-conical surface of said cylindrical axial extension and disposed in axial alignment with said at least one generally annular separating wall.

12. In a gas turbine engine comprising a rotatable rotor supported for rotation within a stationary stator by at least one forward bearing lubricated by oil within an oil sump for collecting oil for recirculation onto said bearing and an air pressurized sump seal for preventing leakage of lubricating oil from said sump, an integrated slinger/runner apparatus comprising:
    an annular sump seal having a first generally annular contact brush seal supported by a stationary seal support structure;
    a generally annular runner rotatable with said rotor and comprising an axially forward section including a radially outer contact surface for engaging said sump seal, a frusto-conical aft section having an annular radially outwardly tapered exterior surface extending aft from said forward section, and means for blocking oil flow axially forward along said runner from said radially outwardly tapered exterior surface toward said radially outer contact surface;
    a generally circular disk slinger connected integrally with and attached coaxially to said runner at the axially aft end thereof; and
    a cylindrical sleeve extending axially downstream from said stationary seal support structure.

13. The apparatus of claim 12 wherein said cylindrical sleeve has a circumferential scavenger groove in the radially external surface of said cylindrical sleeve surrounding said axially forward section of said runner.

14. The apparatus of claim 13, wherein said means for blocking oil flow axially forward comprises:

a circumferential groove extending circumferentially about the exterior surface of said runner disposed axially between said radially outer contact surface and said radially outwardly tapered exterior surface of said runner.

15. The apparatus of claim 14, further comprising:
a radially outwardly stepped ring projecting radially outward from said runner and having a roughened stepped surface located axially downstream of and adjacent said radially outer contact surface.

16. In a gas turbine engine comprising a rotatable rotor supported for rotation within a stationary stator by at least one forward bearing lubricated by oil within an oil sump for collecting oil for recirculation onto said forward bearing and an air pressurized sump seal for preventing leakage of lubricating oil from said oil sump, a lubricating oil scavenging apparatus comprising:
a contact seal mounted onto a stationary seal support structure by a stationary contact seal holder;
a generally cylindrical runner comprising a generally cylindrical forward section having a radially exterior surface integral with a generally annular frusto-conical aft section;
a disk-shaped slinger integrally and coaxially joined at the axially aft end of said frusto-conical aft section;
at least one generally annular separating wall extending generally radially from and generally perpendicular to the radially outer surface of said frusto-conical aft section; and
a first generally cylindrical axial extension extending axially downstream from said stationary contact seal holder having a stationary abradable strip disposed radially inside said cylindrical axial extension and generally axially aligned with said at least one generally annular separating wall.

17. The apparatus of claim 16 further comprising:
a cylindrical axial member attached to said stationary seal support structure and disposed radially outside said cylindrical axial extension, having a circumferential groove surrounding the radially outer circumferential surface of said cylindrical axial member.

18. The apparatus of claim 17, wherein:
said cylindrical axial extension extends aftward from said stationary contact seal holder includes a radially inner frusto-conical surface extending generally parallel to the radially outer surface of said frusto-conical aft section, and
said stationary abradable strip is disposed on said radially inner frusto-conical surface.

19. The apparatus of claim 16 further comprising:
an axially extending cylindrical member attached to said stationary seal support structure and disposed radially outside said axially extending hollow cylindrical member, having a circumferential groove surrounding the radially outer circumferential surface of said axially extending cylindrical member.

20. The apparatus of claim 19, wherein;
said axially extending hollow cylindrical member extends aftward from said stationary contact seal holder and includes a radially inner cylindrical surface generally concentric with the rotor axis of rotation; and
said stationary abradable strip is disposed on said radially inner cylindrical surface.

* * * * *